(12) United States Patent
Casanova

(10) Patent No.: US 9,123,453 B2
(45) Date of Patent: Sep. 1, 2015

(54) CABLE GLAND

(75) Inventor: Reto Casanova, Pfäffikon (CH)

(73) Assignee: Huber+Suhner AG, Herisau (CH)

( * ) Notice: Subject to any disclaimer, the term of this patent is extended or adjusted under 35 U.S.C. 154(b) by 140 days.

(21) Appl. No.: 13/994,829

(22) PCT Filed: Dec. 17, 2010

(86) PCT No.: PCT/EP2010/070061
§ 371 (c)(1),
(2), (4) Date: Nov. 15, 2013

(87) PCT Pub. No.: WO2012/079644
PCT Pub. Date: Jun. 21, 2012

(65) Prior Publication Data
US 2014/0090887 A1 Apr. 3, 2014

(51) Int. Cl.
*H02G 3/00* (2006.01)
*H01B 7/18* (2006.01)
(Continued)

(52) U.S. Cl.
CPC ............... *H01B 7/181* (2013.01); *H01B 7/041* (2013.01); *H01R 9/0527* (2013.01);
(Continued)

(58) Field of Classification Search
CPC . H02G 3/0675; H02G 3/0641; H02G 3/0666; H02G 15/007; H02G 15/00; H02G 15/04; H02G 15/064; F16C 1/107; F16C 1/262; F16C 1/102; H01B 7/181; H01B 7/041; H01B 7/18; H01R 9/0527; H01R 13/562; H01R 13/5845

USPC ............. 174/99 R, 72 A, 650, 652, 653, 68.1, 174/73.1, 74 R, 77 R, 137 R, 152 G, 153 G, 174/152 R, 84 R, 655, 651, 654; 248/56, 49; 16/2.1, 2.2; 439/578, 583
See application file for complete search history.

(56) References Cited

U.S. PATENT DOCUMENTS 5,336,850 A * 8/1994 Mitsch ........................... 174/653
5,600,094 A * 2/1997 McCabe ........................ 174/653
(Continued)

FOREIGN PATENT DOCUMENTS

DE 24 05 241 A1 8/1975
DE 92 01 848 U1 5/1992
(Continued)

*Primary Examiner* — Angel R Estrada
(74) *Attorney, Agent, or Firm* — Pauley Erickson & Kottis

(57) ABSTRACT

The invention relates to a cable gland (10) for a cable (20), comprising an outer shield (26), a cable sleeve (21) enclosing the outer shield (26) and an anti-kink grommet (22) which is injection molded externally onto the cable sleeve (21) and has stop means for the cable gland (10). Simple and reliable contact is achieved in that the cable gland (10) a) has a substantially hollow cylindrical electrically conductive cable gland body (11) which is pushed from one side as far as the stop means over the anti-kink grommet (22) and projects over the anti-kink grommet (22) with the end opposite the stop means, b) has a union nut (12) which can be screwed on the cable gland body (11) and is pushed from the other side as far as the stop means over the anti-kink grommet (22), and c) has an electrically conductive substantially hollow cylindrical contact ring (14) which can be pushed over the cable (20) in a contacting manner into the projecting end of the cable gland body (11) and is designed for receiving and fastening the outer shielding (26) of the cable (20) with contact.

11 Claims, 2 Drawing Sheets

(51) Int. Cl.
  *H01B 7/04* (2006.01)
  *H01R 9/05* (2006.01)
  *H01R 13/56* (2006.01)
  *H01R 13/58* (2006.01)
  *H02G 3/06* (2006.01)
  *H02G 15/007* (2006.01)

(52) U.S. Cl.
  CPC ......... *H01R 13/562* (2013.01); *H01R 13/5845* (2013.01); *H02G 3/0666* (2013.01); *H02G 3/0675* (2013.01); *H02G 15/007* (2013.01)

(56) References Cited

U.S. PATENT DOCUMENTS

| | | | |
|---|---|---|---|
| 5,691,505 A * | 11/1997 | Norris | 174/655 |
| 5,984,724 A | 11/1999 | McNeel | |
| 6,007,383 A | 12/1999 | Cabes | |
| 6,259,029 B1 * | 7/2001 | Hand | 174/74 R |
| 6,809,263 B2 * | 10/2004 | Jackson | 174/651 |
| 8,692,139 B2 * | 4/2014 | Aldrich et al. | 174/653 |
| 8,895,878 B2 * | 11/2014 | Drotleff et al. | 174/654 |
| 8,919,221 B2 * | 12/2014 | Chiou | 439/583 |

FOREIGN PATENT DOCUMENTS

| | | |
|---|---|---|
| DE | 297 15 811 U1 | 12/1997 |
| DE | 101 35 971 C1 | 4/2003 |
| DE | 20 2005 014 601 U1 | 12/2005 |
| EP | 0 339 544 A2 | 11/1989 |
| EP | 0 542 102 A1 | 5/1993 |
| EP | 0 803 954 A2 | 10/1997 |
| EP | 1 689 057 A1 | 8/2006 |

* cited by examiner

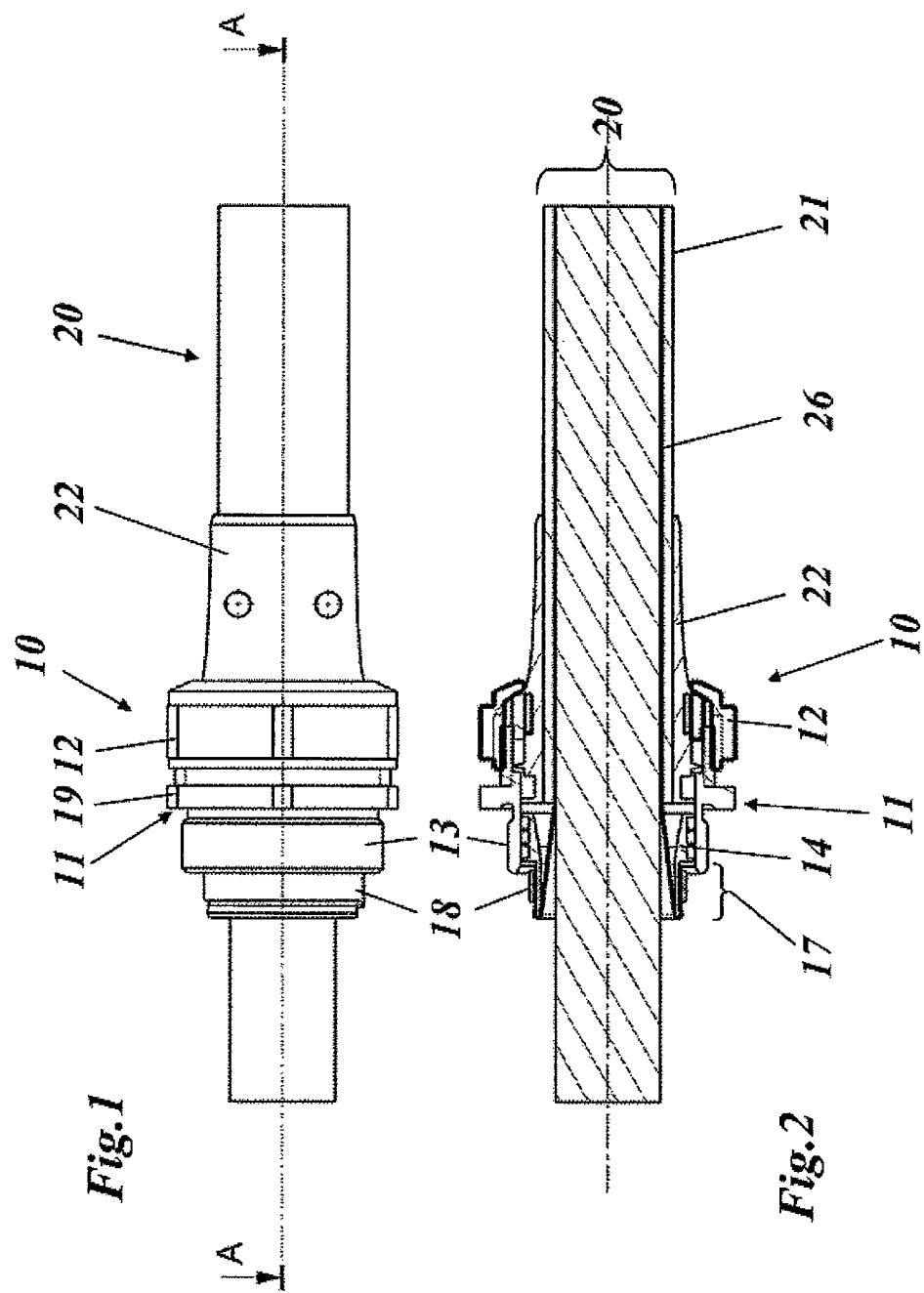

CABLE GLAND

BACKGROUND OF THE INVENTION

1. Field of the Invention

The present invention refers to the field of electrical cables. It relates to a cable gland as claimed in the preamble of claim 1.

2. Discussion of Related Art

In applications in the railway sector, multi-core, thick, (relatively) flexible cables which have to be tailored to the distance to be bridged are usually used for establishing power-supply and signaling connections between individual carriages and/or traction units and/or locomotives of a train. Said tailoring is usually difficult on account of problems of space. This is true particularly for the requisite cable glands with which the ends of the cable are inserted into the housings of the parts which are to be connected and are screwed there.

An earlier application (DE 101 35 971 C1) proposed a cable gland and a cable anti-kink means for such cables in order to simplify the tailoring process, in which improved tailoring is achieved by the outside diameter of the anti-kink grommet being smaller than the clear width of the passage hole in a first cable gland part, and by holding means which interact with the gland parts being in the form of removable holding parts which engage with the anti-kink grommet in respect of the axial direction.

External shielding of the cable and connection of said cable in the region of the cable gland is not taken into consideration in the case of said known cable gland. However, applications in the railway sector specifically may require electrical potential differences between the carriages and/or traction units and/or locomotives of a train which are to be connected to be compensated for by means of an external shield in the cables. In the process, comparatively high currents may briefly occur in the multiple-digit ampere range in the cable shield, said currents having to be controlled both within the cable and also in the cable glands. It is also important to have a contact-making means of the shield which is insensitive to the oscillations which occur during operation and severe vibrations or sudden movements of the cable.

A large number of proposals for how a cable shield can be connected to a cable gland in a simple and reliable manner have already been made in the past.

Document DE 297 15 811 U1 discloses a cable gland for grounding or shielding cables, in which the annular contact insert, by way of its integrally formed contact fingers which extend in the axial direction, is pressed against the exposed shielding braid of the cable, so as to make contact from the outside, during screwing. However, a simple press contact of this kind is too sensitive to movements of the cable relative to the gland, especially since friction between contact fingers and the shield can easily damage the shield.

Document DE 20 2005 014 601 U1 discloses a connection arrangement for connecting a shielded cable to an electrically conductive housing, wherein the cable has at least one internal conductor and an electrically conductive shield which surrounds the internal conductor. An electrically conductive shield support is arranged on the housing, the cable being at least partially received by said cable support. A first contact-pressure apparatus presses the shield against a contact region of the shield support. The shield support also has a holding region against which the cable can be pressed by means of a second contact-pressure apparatus in order to be mechanically connected to the housing. In this case, pipe clamps, for example, are used as contact-pressure apparatuses. However, these are not a cable gland.

Document EP 0 542 102 A1 discloses an electrical plug connector for a shielded cable, in which the electrical connection between the shield and the plug connector housing is made by an electrically conductive elastomeric part which is held in the housing in a compressed manner in the axial direction and seals off the plug connector from moisture at the same time. Similar disadvantages to those in the abovementioned document DE 297 15 811 U1 apply to this solution.

Document EP 0 803 954 A2 discloses a cable gland which comprises a connection piece which can be fixed to a housing, and a screw element which can be screwed to the connection piece and through which a cable is routed. A holding ring which can be acted on by the screw element in the direction of the supporting surface is provided between the screw element and a supporting surface of the connection piece in an interior space in the connection piece. The holding ring has a pressure surface. When the holding ring is acted on by the screw element, a cable shield which is routed from an internal conductor region of the cable to the outside can be clamped between the pressure surface and a mating surface and is therefore electrically conductively connected to the connection piece. A disadvantage is that clamping of the shield by the gland itself cannot be exactly controlled in this case.

Finally, document U.S. Pat. No. 6,007,383 discloses a connection apparatus for a shielded cable, in which the shield is pushed over a sleeve of a receiving part and is fixed there, it then being possible for the receiving part to be screwed to a cup-like fastening part. This solution is not suitable for a cable with an injection-molded anti-kink grommet. It is particularly also unsuitable for cables which are subject to severe bending, on account of the manner in which the shield is fastened.

SUMMARY OF THE INVENTION

It is an object of the invention to design a cable gland of the kind cited in the introductory part such that contact is reliably made with the shield with a high current-carrying capacity and is permanently maintained even given severe vibrations and dynamic loading of the cable, as can occur due to deflections of the carriage bodies.

The object is achieved by claim 1.

The cable gland according to the invention is intended for a cable which comprises at least a shield, a cable sheath which surrounds the shield, and an anti-kink grommet which is injection-molded onto the outside of the cable sheath and has stop means for the cable gland. Said cable gland is distinguished in that it a) has a substantially hollow-cylindrical electrically conductive cable gland body which is pushed over the anti-kink grommet from one side as far as the stop means and projects beyond the anti-kink grommet by way of that end which is opposite the stop means, b) has a union nut which can be screwed to the cable gland body and is pushed over the anti-kink grommet from the other side as far as the stop means, and c) has an electrically conductive, substantially hollow-cylindrical, contact-making ring which is received by the cable gland body in a contact-making manner and is designed to receive and fasten, in a contact-making manner, the shield of the cable.

A first refinement of the cable gland according to the invention is characterized in that the contact-making ring is mounted in the cable gland body in a longitudinally displaceable manner. This provides reliable mechanical decoupling between the cable and the contact-making ring on the cable gland body.

Another refinement of the invention is characterized in that the contact-making ring has an externally circumferential, annular contact groove which receives an annular contact element for creating electrical contact between the contact-making ring and the cable gland body. The annular contact element provides more reliable contact, which is suitable for high currents, over the entire circumference. At the same time, it can absorb frictional movements between the contact-making ring and the cable gland body without damage when it is composed of a corresponding material.

However, the contact element can also be in the form of a radially resilient metal ring, in particular in accordance with the "canted coil" principle. Elements of this type are known, for example, under the name Bal Seal® and disclosed in EP 0 339 544 B1.

However, the contact element can also be in the form of an O-ring which is composed of electrically conductive plastic or is coated with an electrically conductive coating and therefore can additionally perform a sealing function.

A further refinement of the cable gland according to the invention is distinguished in that an externally circumferential, annular fixing groove is arranged in front of and/or behind the contact groove in the axial direction and receives an O-ring for fixing the contact-making ring in the cable gland body. The axial movement of the contact-making ring is damped by the O-rings. At the same time, the contact element is additionally protected against external influences.

A further refinement of the invention is characterized in that the contact-making ring projects out of the cable gland body by way of a sleeve section, and in that the shield of the cable, which shield is bent outward and back, can be fastened in a clamping manner on the outer face of the sleeve section.

The shield is preferably fastened on the outer face of the sleeve section by means of a tightening strip.

The injection-molded anti-kink grommet is composed, in particular, of a plastic.

A further refinement of the invention is characterized in that the stop means comprise an externally circumferential screwing groove which is made in the anti-kink grommet, and also stop elements which can be inserted into the screwing groove in an interlocking manner, project radially outwardly out of the screwing groove and against which the cable gland body and the union nut stop on opposite sides. In this case, the stop elements are advantageously secured against rotation in the screwing groove by an interlocking connection.

In particular, the stop elements are in the form of half-shells.

The anti-kink grommet, the stop elements and the union nut are preferably dimensioned such that the union nut can be pushed completely over the anti-kink grommet when the stop elements are missing. In principle, the union nut, but also the gland body, are pushed onto the cable before the anti-knick grommet is injection-molded.

BRIEF DESCRIPTION OF THE DRAWINGS

The invention will be explained in greater detail below with reference to exemplary embodiments in connection with the drawing, in which:

FIG. 1 shows a side view of an exemplary embodiment of a cable gland according to the invention;

FIG. 2 shows the longitudinal section in plane A-A through the cable gland of FIG. 1.

DETAILED DESCRIPTION OF THE INVENTION

Figure 3:
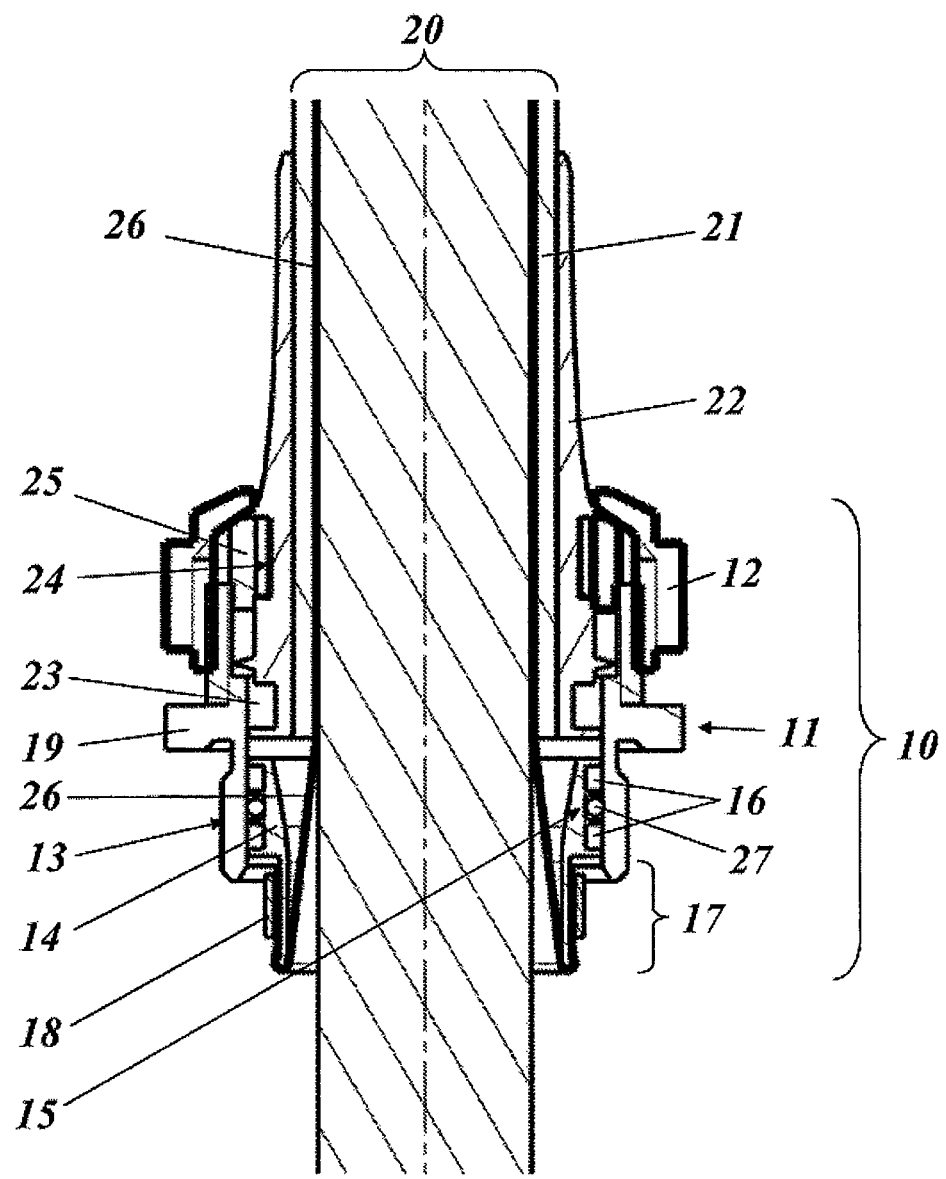
FIG. 3 shows an enlarged detail from the illustration of FIG. 2.

FIG. 1 shows a side view of an exemplary embodiment of a cable gland 10 according to the invention. FIG. 2 shows a longitudinal section through this cable gland 10 in the plane A-A of FIG. 1. The cable gland 10 sits on a cable 20, the interior of said cable or the individual cores of said cable not being illustrated any further. In the illustrated example, the cable 20 has an outer shield 26 which can have, for example, the shape of a tube-like wire braid. The outer shield 26 is surrounded by a protective cable sheath 21 which ends in the interior of the cable gland 10 in order to expose the shield 26 at that point for contact-making purposes (see FIG. 3). However, individually shielded cores or core groups may also be present, it being possible for the shield of said cores or core groups to be conductively connected to the cable gland 10 in the same way as described for the outer shield 26.

An anti-kink grommet 22 is injection-molded onto the outside of the cable 20, said anti-kink grommet extending equally far into the cable gland 10 as the cable sheath 21. The anti-kink grommet 22 is preferably composed of a stable, elastically deformable plastic and has two circumferential annular grooves, specifically a screwing groove 24 and a sealing groove 23, one behind the other in the axial direction. The screwing groove 24 has the same function as the annular groove in the cable anti-kink protection means of DE 101 35 971 C1 (24 in FIG. 4 of said document) which is cited in the introductory part. It receives two removable half-shells 25 which together form a ring which projects radially out of the screwing groove 24 and against which the screwable parts 11 and 12 of the cable gland 10 can stop.

Said screwable parts of the cable gland 10 are a substantially hollow-cylindrical cable gland body 11 and a union nut 12 which can be screwed to said cable gland body. As described in DE 101 35 971 C1 which is cited above, the union nut—when the half-shells 25 are not yet inserted into the screwing groove 24—can be pushed over the anti-kink grommet 22 without difficulty. If the half-shells 25 are then inserted into the screwing groove 24, the cable 20 with the anti-kink grommet 22 can be pushed into the cable gland body 11 until it stops against the half-shells 25. The union nut 12 which sits on the cable 20 is then screwed onto the cable gland body 11 until it rests against the half-shells 25 from the other side. The cable 20 with the injection-molded anti-kink grommet 22 is then fixed in the cable gland 10.

In this screwed state, the anti-kink grommet 22 and therefore also the cable sheath 21 extend only approximately halfway into the cable gland body 11. A substantially hollow-cylindrical contact-making ring 14 can now be pushed into the remaining length of the cable gland body 11 from the other side, the intention being for said contact-making ring to create electrical contact between the shield 26 and the cable gland body 11. The contact-making ring 14 sits in the cable gland body 11 in a longitudinally displaceable manner. It projects out of the cable gland body 11 by way of a sleeve section 17. The sleeve section 17, which has a rounded annular edge at its free end, serves to fasten the shield 26 in a contact-making manner. Said shield is bent back outward around the rounded edge and to the outer face of the sleeve section 17 in such a way that the bent-back shield 26 rests largely against the cylindrical outer surface. In this state, the bent-back shield 26 is permanently fixed on the cylindrical outer face of the sleeve section 17 by way of a tightening strip 18 which is pushed over the sleeve section 17 with the shield 26 and is thus connected to the contact-making ring 14 in an electrically highly conductive and reliable manner.

Assembly of the cable gland 10 is even more simple when the assembly procedure is structured as follows:

a) the anti-kink grommet 22 is first injection-molded onto the cable 20;

b) the cable sheath 21 is then removed from the cable (sheath removal) as far as the anti-kink grommet 22;
c) the shield 26 or the shielding braid is cut to length and exposed (this applies both for common and for individual shields);
d) the contact-making ring 14 is pushed onto the exposed cable end;
e) the shield 26 (and possibly further shields) is (are) placed over the sleeve section 17 of the contact-making ring 14 and fixed to the tightening strip 18 in a contact-making manner;
f) the prefabricated cable with the contact-making ring 14 is introduced into the cable gland body 11;
g) the half-shells 25 are inserted into the screwing groove 24 and pushed in until they stop against the cable gland body 11; and
h) the union nut 12 which is already located on the cable is fitted.

The electrical contact between the contact-making ring 14 and the cable gland body 11 is created by a contact ring 27 (FIG. 3) which is inserted into an annularly circumferential contact groove 15 on the outer face of the contact-making ring 14. The contact ring 27 can be, for example, an O-ring which is composed of an electrically conductive or conductively coated plastic. In respect of relatively high currents, a contact ring 27 which is in the form of a radially resilient metal ring, in particular in accordance with the "canted coil" principle, is particularly expedient. Contact rings of this kind which have the shape of an obliquely wound wire spiral are known, for example, by the name Bal Seal® and are described in EP 0 339 544 B1.

Two further identical fixing grooves 16 are arranged on the outer face of the contact-making ring 14 on both sides of the contact groove 15, it being possible for said fixing grooves to receive conventional O-rings in order to fix the contact-making ring 14 in the cable gland body 11 more or less securely. At the same time, said O-rings protect the contact ring 27 which is situated between them against harmful external influences.

A flange-like stop 19 is integrally formed in the central region of the cable gland body 11 and has a hexagonal outer circumference and serves for locking purposes when tightening the union nut 12. An external thread 13 is provided on the outer face of the cable gland body 11 on that side of the stop 19 which is situated opposite the union nut 12. The cable gland 10 can be plugged through a corresponding opening in a housing wall or a plug housing by way of said external thread 13 as far as the stop 19, and can be fixed with a screw which is screwed onto the external thread 13.

The described cable gland 10 can be used, as already mentioned in the introductory part, primarily for strong cables in the railway sector, the outside diameter of the cable 20 being in the range of, for example, 10-50 mm.

The invention claimed is:

1. A cable gland (10) for a cable (20) including at least a shield (26), a cable sheath (21) which surrounds the shield (26), and an anti-kink grommet (22) formed onto the outside of the cable sheath (21) and includes stop means (24, 25) for the cable gland (10), the cable gland (10) comprising:

a. a substantially hollow-cylindrical electrically conductive cable gland body (11) which is pushed over the anti-kink grommet (22) from one side as far as the stop means (24, 25) and projects beyond the anti-kink grommet (22) by way of that end which is opposite the stop means (24, 25),
b. a union nut (12) which can be screwed to the cable gland body (11) and is pushed over the anti-kink grommet (22) from the other side as far as the stop means (24, 25), and
c. an electrically conductive, substantially cylindrical, contact-making ring (14) which is received by the cable gland body (11) in a contact-making manner and is designed to receive and fasten, in a contact-making manner, the shield (26) of the cable (20), wherein the contact-making ring (14) is mounted in the cable gland body (11) in a longitudinally displaceable manner.

2. The cable gland as claimed in claim 1 wherein the contact-making ring (14) includes an externally circumferential, annular contact groove (15) which receives an annular contact element (27) for creating electrical contact between the contact-making ring (14) and the cable gland body (11).

3. The cable gland as claimed in claim 2, wherein the contact element (27) comprises a radially resilient metal ring.

4. The cable gland as claimed in claim 2, wherein the contact element (27) comprises an O-ring of electrically conductive plastic or coated with an electrically conductive coating.

5. The cable gland as claimed in claim 2, wherein an externally circumferential, annular fixing groove (16) is arranged in front of and/or behind the contact groove (15) in the axial direction and receives an O-ring for fixing the contact-making ring (14) in the cable gland body (11).

6. The cable gland as claimed in claim 1, wherein the contact-making ring (14) projects out of the cable gland body (11) by way of a sleeve section (17), and in that the shield (26) of the cable (20), which shield is bent outward and back, can be fastened in a clamping manner on an outer face of the sleeve section (17).

7. The cable gland as claimed in claim 6, wherein the shield (26) is fastened on the outer face of the sleeve section (17) by means of a tightening strip (18).

8. The cable gland as claimed in claim 1, wherein anti-kink grommet (22) is injection-molded of a plastic.

9. The cable gland as claimed in claim 1, wherein the stop means (24, 25) comprise an externally circumferential screwing groove (24) in the anti-kink grommet (22), and also stop elements (25) which can be inserted into the screwing groove (24) in an interlocking manner, project radially outwardly out of the screwing groove (24) and against which the cable gland body (11) and the union nut (12) stop on opposite sides.

10. The cable gland as claimed in claim 9, wherein the stop elements are in the form of half-shells (25).

11. The cable gland as claimed in claim 9, wherein the anti-kink grommet (22), the stop elements (25) and the union nut (12) are dimensioned such that the union nut (12) can be pushed completely over the anti-kink grommet (22) when the stop elements (25) are missing.

* * * * *